United States Patent [19]

Guim

[11] Patent Number: 4,673,928

[45] Date of Patent: Jun. 16, 1987

[54] FUSE CAP WARNING LIGHT

[76] Inventor: Raul Guim, 834 Venetia, Coral Gables, Fla. 33134

[21] Appl. No.: 830,189

[22] Filed: Feb. 18, 1986

Related U.S. Application Data

[63] Continuation-in-part of Ser. No. 596,368, Apr. 3, 1984, abandoned.

[51] Int. Cl.⁴ ............................................. G08B 21/00
[52] U.S. Cl. ................................. 340/638; 337/265; 337/266; 340/331; 340/693; 250/554
[58] Field of Search ............... 340/638, 639, 644, 331, 340/693; 250/554, 214 AL; 361/2, 3, 8, 13, 91, 173, 174, 176, 177, 104; 324/51 RR, 51 FF, 536; 337/241, 242, 265, 266, 332, 336

[56] References Cited

U.S. PATENT DOCUMENTS

| | | | |
|---|---|---|---|
| 2,206,783 | 7/1940 | Linton | 337/266 |
| 2,659,789 | 11/1953 | Lang | 337/265 |
| 3,072,766 | 1/1963 | Roth | 361/13 X |
| 3,237,057 | 2/1966 | Adkins | 361/173 |
| 3,901,121 | 8/1975 | Kleiner | 340/331 X |
| 4,056,816 | 11/1977 | Guim . | |

FOREIGN PATENT DOCUMENTS

| | | | |
|---|---|---|---|
| 2001033 | 1/1970 | Fed. Rep. of Germany | 337/241 |
| 2110706 | 9/1972 | Fed. Rep. of Germany | 337/265 |

*Primary Examiner*—James L. Rowland
*Assistant Examiner*—D. Myer
*Attorney, Agent, or Firm*—Jesus Sanchelima

[57] ABSTRACT

A warning light device for blown fuse caps having a photosensitive circuit mounted inside an adapter casing that mounts over and is exposed to the fuse element of the fuse caps. The device is powered by batteries contained inside the casing and includes battery energy saving circuits in the form of an intermittent circuit or a low duty cycle circuit that is suitable to provide a visual indication periodically to the user. Light emitting diodes are used as a low power consumption indicating light.

6 Claims, 3 Drawing Figures

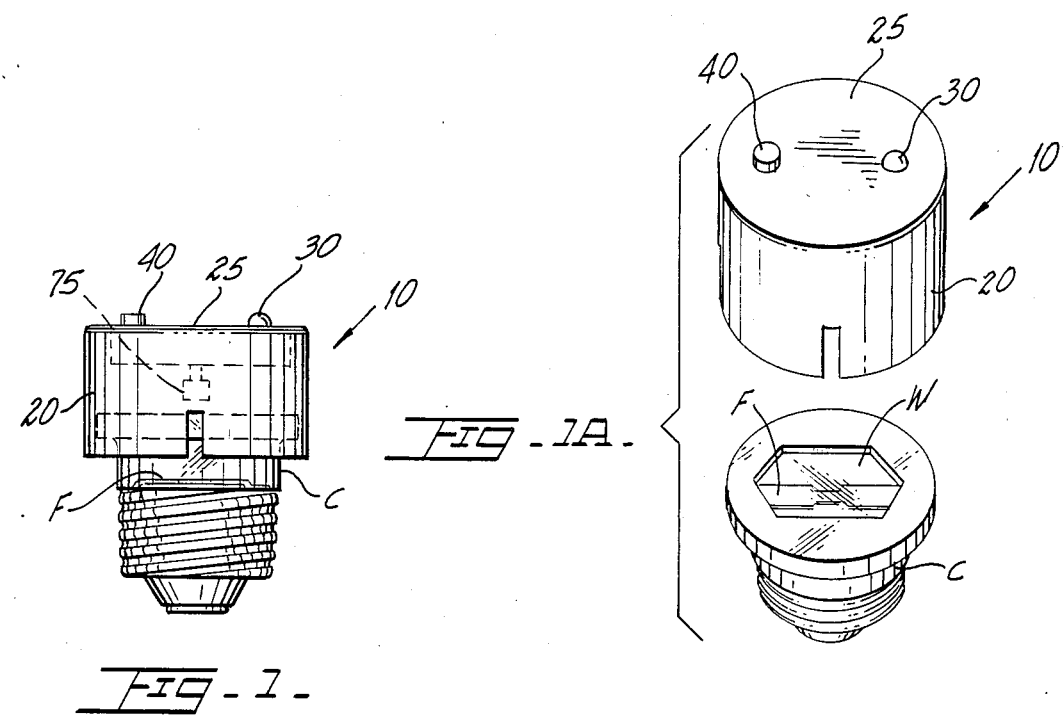
FIG-1.
FIG-1A.
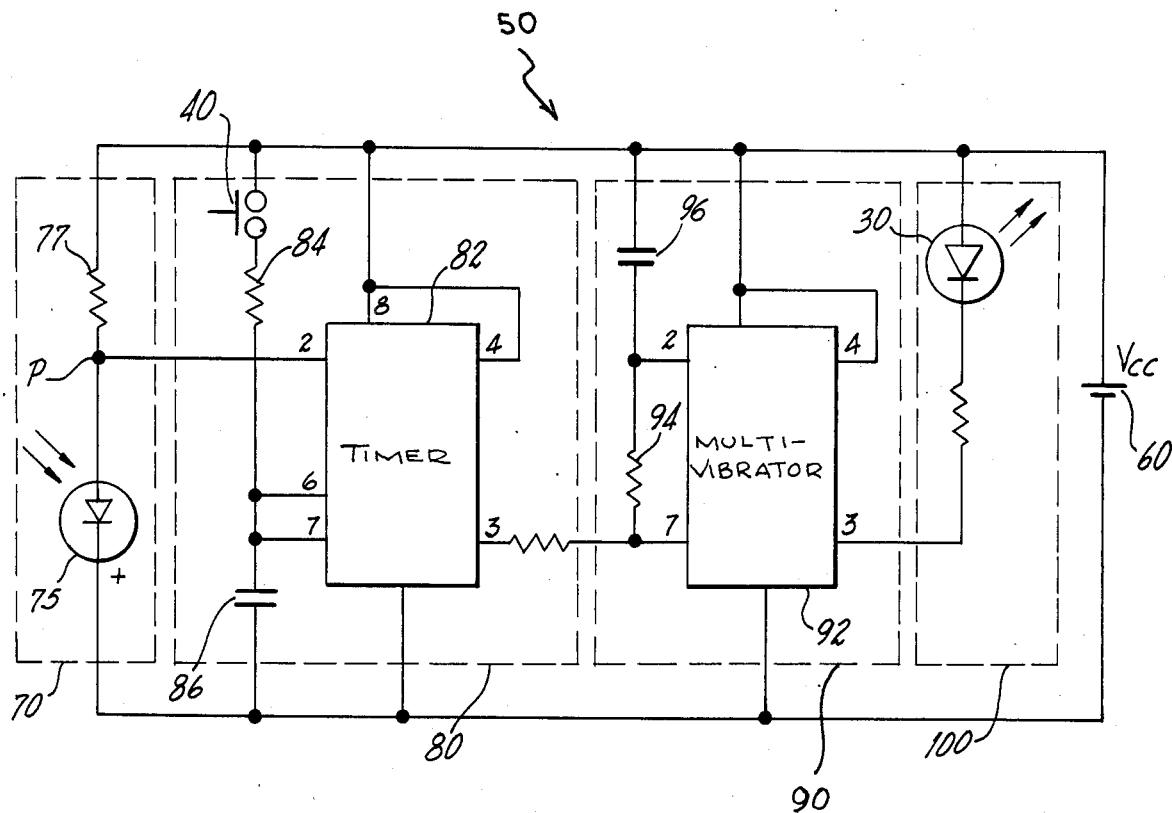
FIG-2.

FUSE CAP WARNING LIGHT

BACKGROUND OF THE INVENTION

1. Other Related Applications

The present application is a continuation-in-part of U.S. application Ser. No. 596,368 filed Apr. 3, 1984, now abandoned.

2. Field of the Invention

The present invention refers to warning lights for blown fuse caps, and more particularly, to such warning lights equipped with photosensitive circuits to detect the spark that occurs when a fuse element is blown.

3. Description of the Prior Art

Conventional fuse caps are usually mounted in fuse boxes in remote areas and it is hard to determine which one of the fuses was blown, especially if the lighting is poor. It is common to go through several of them by unscrewing them and inspecting them closely or by using a lantern if they are within reach. In any event, the user must go through several of them before finding the one that was blown.

The closet prior art known to applicant corresponds to U.S. Pat. No. 4,056,816, issued to the applicant herein. However, it differs from the present invention in that here the warning light is self-powered and does not draw any current from the circuit that is protected. Also, it is adapted to be readily used on conventional round fuse caps without requiring any alteration of the caps' construction.

Another reference within the relevant prior art is German Pat. No. P20010337 issued to Reinhard Hanstein. This foreign patent, however, differs from the present invention in that a fiber optic elements invades the device being protected making it difficult to use with the conventional fuse cap in the average household. It requires a complicated circuitry that is then used to activate an indicator. Obviously, this circuitry required considerable external power which in turn would probably have to be obtained from the same supply that the blown fuse is supposed to protect thereby making it unusable in at least those cases.

Other patents describing the closet subject matter provide for a number of more or less complicated features that fail to solve the problem in an efficient and economical way. None of these patents suggest the novel features of the present invention.

SUMMARY OF THE INVENTION

It is the main object of the present invention to provide a self-powered light indicating warning device that can be easily installed on existing conventional round fuse caps.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 corresponds to a pictorial representation of the preferred embodiment for the fuse cap warning light.

FIG. 1A shows the present invention detached from a conventional screw type fuse cap.

FIG. 2 is a schematic of the circuitry used in the preferred embodiment of the present invention.

DETAILED DESCRIPTION OF THE PREFERRED EMBODIMENT

Referring now to the drawings where the present invention is generally referred to with numeral 10, it can be observed in FIG. 1 that it includes a cylindrical adapter casing 20 with a light emitting diode 30 on its upper surface 25 and a reset switch 40. Circuit 50 shown in FIG. 2 is housed within casing 20. Adapter casing 20 has a diameter that is sufficiently large to allow a snug fit over a conventional round fuse cap C. Fuse cap C has to be of the type that includes a transparent window element W that visually exposes fuse element F. Circuit 50 shown in FIG. 2 is comprised of basically four sub-circuits or assemblies plus a battery assembly 60 feeding them.

Photoelectric sub-circuit 70 includes a photosensitive element 75 that is characterized by changing its internal resistance when exposed to light. In the preferred embodiment, an MRD920 light-activated SCR, Radio Shack's catalog No. 276-1085A was used to implement the function of the photosensitive element 75. Element 75 is connected in series with resistive element 77 and the Vcc voltage of battery assembly 60 is apllied across the series combination so that a certain suitable voltage division is achieved at point P, giving voltage $V_{PL}$ when element 75 is exposed to light and $V_{PN}$ when there is no light. Point P is connected to latching sub-circuit 80 which comprises, primarily, of integrated circuit 82 which in the preferred embodiment corresponds to a TLC 555 chip manufactured, among others, by National Semicondutors. An RC network is applied to the inputs of integrated circuit 82 to provide a suitable time constant for the bistable flip flop configuration of integrated circuit 82. When light is applied to element 75, point P comes to voltage $V_{PL}$ which is connected to input pin 2 of integrated circuit 82 and adequate to activate integrated circuit 82 producing a logic 1 (high) or positive voltage at output pin 3. The output will stay positive at pin 3 for as long as the enabling voltage at P is $V_{PL}$. To reset it, switch (normally open) 40 needs to be closed discharging capacitor 86 through resistor 84.

The output of pin 3 in integrated circuit 82 is connected to the input 7 of integrated circuit 92 in oscillator sub-circuit 90. Integrated circuit 92 is identical to integrated circuit 82 but wired as an astable multivibrator (flip-flop) with capacitive element 96 and resistive element 94, which provide a suitable RC time constant that produces an oscillating signal with a relatively low duty cycle at output pin 3 of integrated circuit 92. It has been observed that a duty cycle of as low as 1.5 percent with a Vcc voltage of 3 volts has been sufficient to drive LED sub-circuit 100 and providing enough energy to LED device 30 to create a visual indication. In the preferred embodiment, however, a duty cycle between 1.5 and 4.0 percent has been utilized to achieve the best compromise between insuring a visual indication and obtaining battery energy savings. This way, the battery energy savings are obtained by using a low duty cycle plus an intermittent indication.

The circuit of FIG. 2 is housed within adapter casing 20 (FIG. 1) in such a way that photoelectric sub-circuit 70, and more particularly, photosensitive element 75, is aligned with fuse element F of conventional cap C when device 10 is mounted thereon. When fuse element F is blown, photosensitive element F sees the spark created, triggering integrated circuit 82 so that an enabling signal is applied to integrated circuit 92 thereby sending low duty cycle pulses with just enough energy to produce a visual indication on LED element 30.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A self-powered warning device for round fuse caps having an exposed fuse element, comprising:
   A. an adapter casing adapted to be removably mounted over said fuse cap;
   B. photosensitive circuit means mounted inside said casing and adapted to detect the spark of said fuse element when an overload condition occurs;
   C. detector circuit means connected to said photosensitive circuit means;
   D. light indicator means connected to said detector circuit means so that the occurrence of an overload condition is visually displayed; and
   E. battery means to power said photosensitive and indicator means.

2. The device set forth in claim 1, wherein said detector circuit means includes oscillator means connected to and activated by said photosensitive means and so arranged and constructed that a signal with low duty cycle is generated at the output of said oscillator means to effectively cause a visual indication by said indicator means.

3. The device set forth in claim 2, wherein said detector circuit means includes switch means for resetting said oscillator means.

4. The device set forth in claim 3 wherein said oscillator means comprises an astable multivibrator so arranged and constructed to provide an output signal with a duty cycle between 1.5 and 4.0 percent.

5. The device set forth in claim 4 wherein said switch means includes a normally open switch.

6. The device set forth in claim 1, wherein said detector circuit means includes latching means connected to and activated by said photosensitive means and having an output connected to said indicator means so that a visual display is produced when an overload condition occurs.

* * * * *